(12) United States Patent
Oshima

(10) Patent No.: US 7,529,202 B2
(45) Date of Patent: May 5, 2009

(54) COMMUNICATION DATA PROCESSING CIRCUIT

(75) Inventor: Yoshinobu Oshima, Tokyo (JP)

(73) Assignee: NEC Corporation, Tokyo (JP)

( * ) Notice: Subject to any disclaimer, the term of this patent is extended or adjusted under 35 U.S.C. 154(b) by 1178 days.

(21) Appl. No.: 10/640,327

(22) Filed: Aug. 14, 2003

(65) Prior Publication Data

US 2004/0032855 A1 Feb. 19, 2004

(30) Foreign Application Priority Data

Aug. 19, 2002 (JP) .............................. 2002-238156

(51) Int. Cl.
*G06F 1/32* (2006.01)
(52) U.S. Cl. ...................... 370/311; 713/322
(58) Field of Classification Search ................ 370/229, 370/230, 230.1, 231, 235, 311; 375/369, 375/373; 713/310, 320, 322, 400, 601
See application file for complete search history.

(56) References Cited

U.S. PATENT DOCUMENTS

| | | | | |
|---|---|---|---|---|
| 4,435,761 A | * | 3/1984 | Kimoto | 713/601 |
| 4,615,005 A | * | 9/1986 | Maejima et al. | 713/601 |
| 4,841,440 A | * | 6/1989 | Yonezu et al. | 713/322 |
| 4,851,987 A | * | 7/1989 | Day | 713/601 |
| 4,910,777 A | * | 3/1990 | Larson et al. | 713/150 |
| 6,035,410 A | * | 3/2000 | Ebeshu et al. | 713/501 |
| 6,216,232 B1 | * | 4/2001 | Komura et al. | 713/300 |
| 6,647,502 B1 | * | 11/2003 | Ohmori | 713/322 |
| 6,728,271 B1 | * | 4/2004 | Kawamura et al. | 370/536 |

FOREIGN PATENT DOCUMENTS

| | | |
|---|---|---|
| JP | 6-51863 | 2/1994 |
| JP | 6-152695 | 5/1994 |
| JP | 10-215451 | 8/1998 |
| JP | 11-116131 | 4/1999 |
| JP | 2000-77983 | 3/2000 |
| JP | 2001-177382 | 6/2001 |

* cited by examiner

*Primary Examiner*—Wing F Chan
*Assistant Examiner*—Duc T Duong
(74) *Attorney, Agent, or Firm*—Young & Thompson

(57) ABSTRACT

A communication data processing circuit is provided that suitably controls an on/off operation of clock signals, thus effectively reducing the power consumption. The communication data processing circuit processes communication data based on a clock signal to be input. The communication data processing circuit includes a packet processing section 30 for processing communication data, a packet counter 10 for discriminating between the presence and absence of communication data under process in the packet processing section 30, and a clock controller 40 for inputting or halting a clock signal to the packet processing section 30 in response to an output of the packet counter 10.

17 Claims, 5 Drawing Sheets

COMMUNICATION DATA PROCESSING CIRCUIT

BACKGROUND OF THE INVENTION

The present invention relates to a circuit for processing communication data such as packets or cells, and more particularly to a communication data processing circuit realizing low power consumption.

In the recent Internet environment, the problems of power costs and global warming due to increased electric power and due to continuous energizing of respective apparatuses have been pointed out with the advance of conversion to broadband and to always-on connection.

In general access-system communication lines, the actual time period during which packets are transmitted is very short. Usually, most of the transmission time period is not used to transmit packets. However, the conventional packet processing circuit wastefully consumes the electric power because the clock signal is always in an on state, regardless of the presence or absence of packet transmission.

As to the technique of aiming at low power consumption of a packet processing circuit, JP-P1999-116131A, for example, discloses the processing circuit that makes clocks therefor in an on state by a predetermined period from a packet inputting time to suppress the power consumption.

In another technique, JP-P2000-77983A discloses the circuit that validates a clock signal only when data changes with a gate signal applied to the clock port for a flip-flop in word units of data, so that power consumption is suppressed.

Of the above-mentioned related circuits, the packet processing circuit, in which the packet length varies largely, disclosed in JP-P1999-116131A requires setting the time period the clock to an ON state based on a packet with a maximum packet length. For that reason, the packet processing circuit has the disadvantage that low power consumption cannot be effectively accomplished to shorter packets.

Moreover, the circuit disclosed in JP-P2001-177382A applies a gate signal to the clock port of the flip-flop in data word units and validates the clock only when data changes. For that reason, there is the disadvantage that the unit for gating is segmentized and the control circuit is complicated and increased in number.

SUMMARY OF THE INVENTION

The present invention is made to solve the above-mentioned problems. An object of the present invention is to provide a communication data processing circuit for suitably controlling an on/off operation of clock signals to reduce the power consumption effectively.

Another object of the present invention is to provide a communication data processing circuit capable of suppressing the power consumption to decrease the heat generated therein and of realizing its small-sized configuration.

According to the present invention, a communication data processing circuit processes communication data based on a clock signal to be input, the processing circuit accepting the clock signal when communication data to be processed exists and halting the clock signal when no communication data to be processed exists.

The communication data processing circuit further comprises a processing section for processing communication data; a data discrimination section for discriminating between the presence and absence of the communication data under process in the processing section; and a clock controller for inputting or halting the clock signal to the processing section in response to an output of the data discrimination section.

In the communication data processing circuit, the data discrimination section comprises a counter counts up in response to the communication data input to the processing section and counts down in response to the communication data output from the processing section. Moreover, the clock controller halts the clock signal when the value of the counter is "0" and inputs the clock signal to the processing section when the value of the counter is a value except "0".

In the communication data processing circuit, the counter counts up in response to a signal representing the beginning of the communication data input to the processing section and counts down in response to a signal representing an end of the communication data output from the processing section and turns off a control signal when a count value is "0" and turns on the control signal when a count value is a value except "0". The clock controller halts the clock signal when the control signal of the counter is in an off state and inputs the clock signal to the processing section when the control signal of the counter is in an on state.

The communication data processing circuit further comprises a timing adjusting section for delaying a timing that the communication data is input to the processing section, by a predetermined clock corresponding to a time period during which both the data discrimination section and the clock controller process.

In the communication data processing circuit, the processing section has a plurality of output ports for the communication data and the counter counts down a count value for each of plural sets of communication data output from the processing section.

In the communication data processing circuit, the processing section has a function of discarding the communication data during process therein. The processing section outputs a discarding signal representing that the communication data has been discarded, and the counter counts down a count value in response to the discarding signal input from the processing section.

The communication data processing circuit comprises plural processing circuits interconnected, each of the plural processing circuits including the processing section, the data discrimination section, and the controller.

In the communication data processing circuit, the communication data comprises packet data, and the processing section comprises a packet processing section that processes the packet data.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
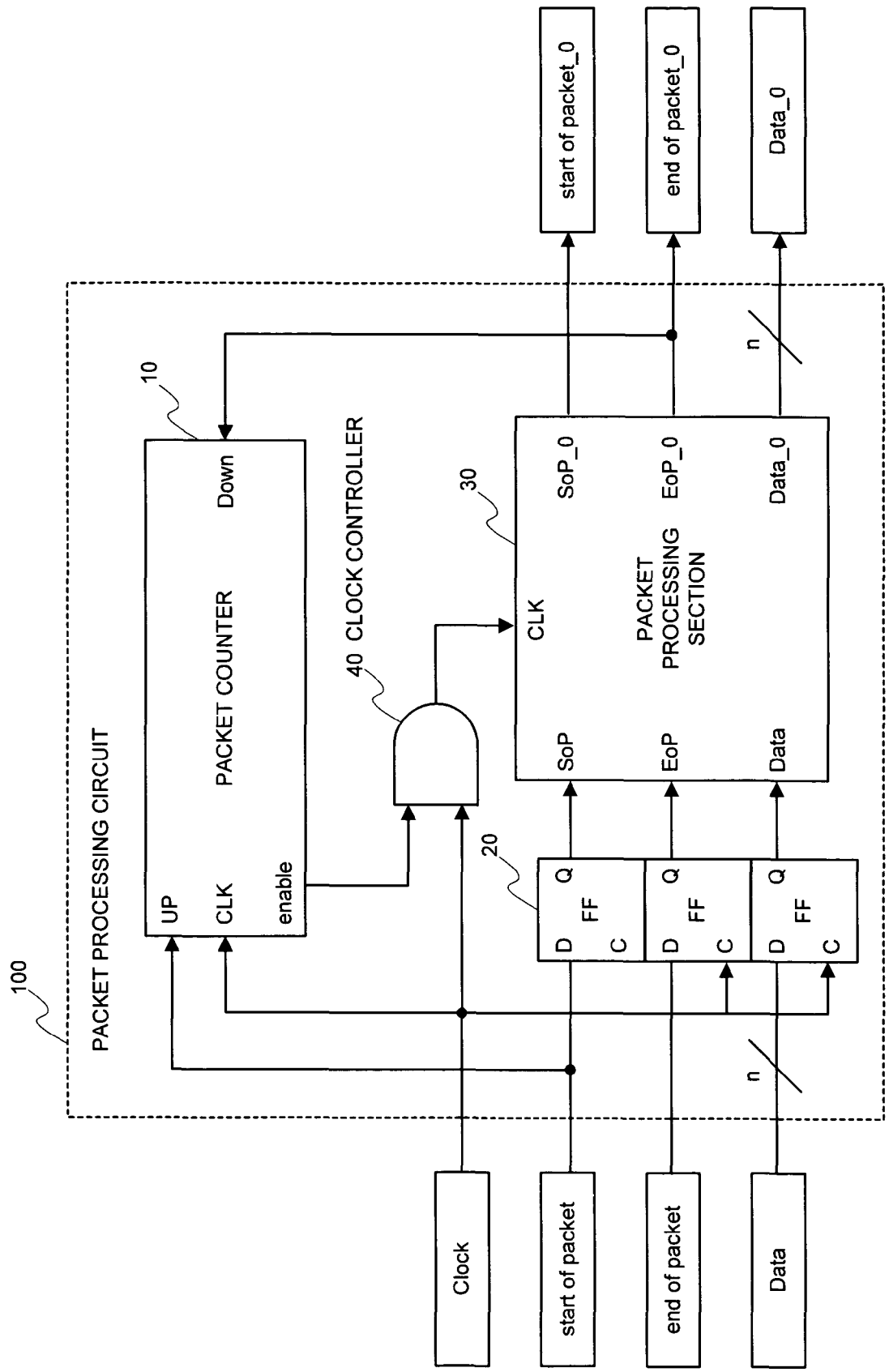
FIG. 1 is a block diagram illustrating the configuration of a packet processing circuit according to a first embodiment of the present invention.

Embodiments according to the present invention will be explained below in detail by referring to attached drawings. FIG. 1 is a block diagram illustrating the configuration of a low-power consumption packet processing circuit according to a first embodiment of the present invention.

According to the first embodiment, a low-power consumption packet processing circuit 100 includes a packet counter 10, a data timing adjuster 20, a packet processing section 30, and a clock controller 40.

The packet counter 10 receives at its input port "UP" a packet head position identification signal, "start of packet", representing the beginning of packet data and thus counts up the count value by "1". Moreover, the packet counter 10 receives at its port "Down" a packet end position identification signal, "end of packet_0", representing an end of packet data output from the output port "EoP_0" of the packet processing section 30 and thus counts down the count value by "1".

When the count value is "0", the packet counter 10 outputs the clock control signal of "Low" from its port "enable". When the count value is "1" or more, the packet counter 10 outputs the clock control signal of "High" from its port "enable".

When the counter value of the packet counter 10 is "0", there is no packet data which is being processed in the packet processing section 30. When the counter value of the packet counter 10 is a value other than "0", there is packet data which is being processed in the packet processing section 30. That is, the packet counter 10 has the function of deciding the presence or absence of packet data.

The data timing adjuster 20 receives a packet head position identification signal "start of packet", a packet end position identification signal "end of packet", and packet data "Data", respectively, and then outputs them to the packet processing section 30, with each of them delayed by one clock. The data timing adjuster 20 can be realized by the flip-flop as shown in FIG. 1.

The packet processing section 30 receives a clock signal "Clock" from the clock controller 40. The packet processing section 30 also receives a packet head position identification signal, a packet end position identification signal, packet data, each output from the data timing adjuster 20, at its port "SoP", its port "EoP", and its port "Data", respectively. The packet processing section 30 performs a packet process including, for example, a protocol process or a route retrieval process. Thus, the port "SoP_0" outputs the packet head position identification signal "start of packet_0". The port "EoP_0" outputs the packet end position identification signal "end of packet_0". The port "Data_0" outputs the packet data "Data_0".

The clock controller 40 receives a clock signal "Clock" and a clock control signal from the packet counter 10. When the clock control signal is "High", the clock controller 40 outputs the clock signal "Clock" without any change. When the clock control signal is "Low", the clock controller 40 inhibits an issuance of the clock signal "Clock".

Next, the operation of a low-power consumption packet processing circuit with the above-mentioned configuration according to the first embodiment will be explained by referring to the time chart shown in FIG. 5.

Figure 5:
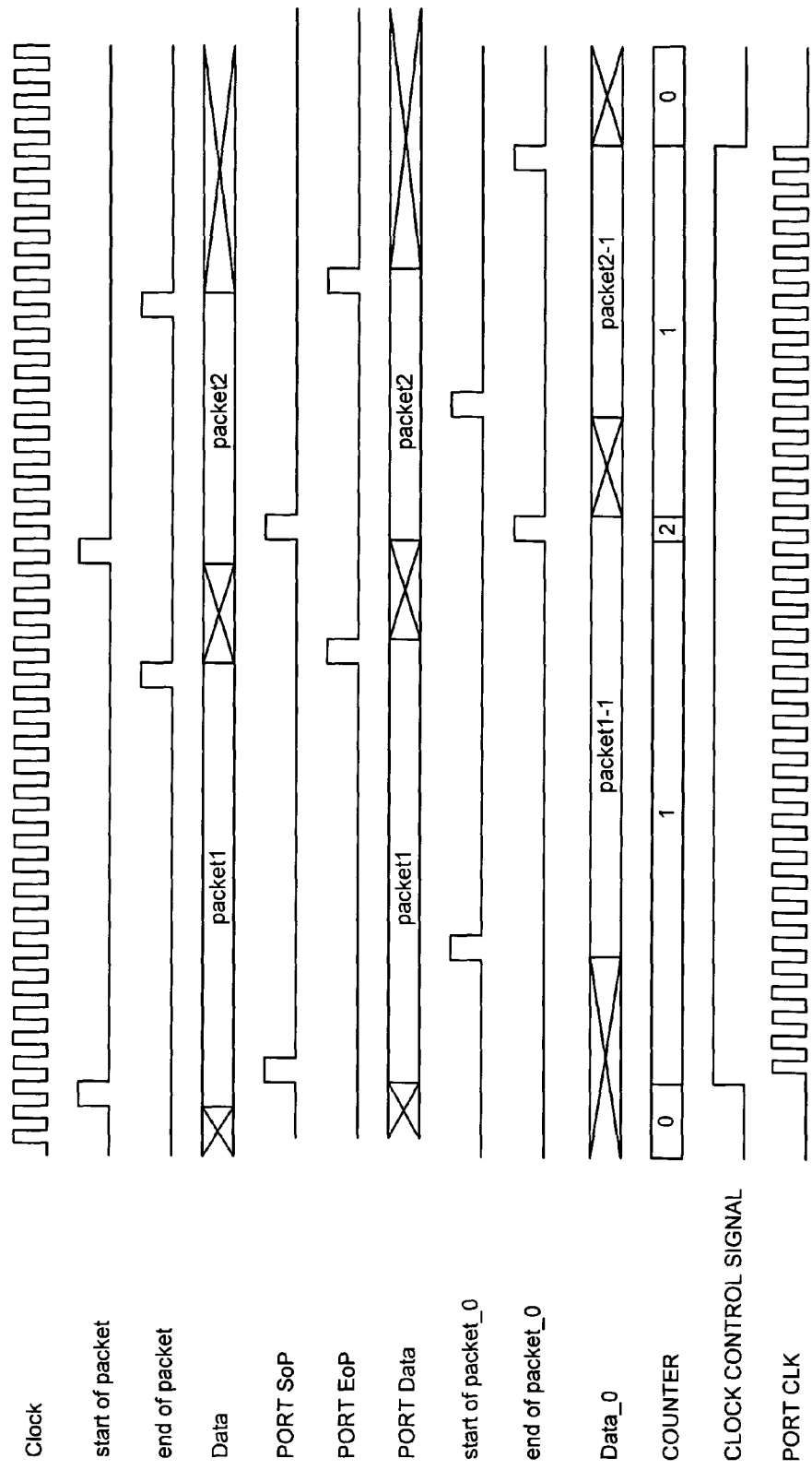
FIG. 5 is a timing chart explaining an operation of a packet processing circuit according to a first embodiment of the present invention.

Referring to FIG. 5, when the packet data "Data" (Packet 1) is input, the data timing adjuster 20 delays the packet head position identification signal "start of packet", the packet end position identification signal "end of packet", and packet data "Data" (Packet 1) by one clock. Then, the data timing adjuster 20 sends them respectively to the port "SoP", the port "EoP", and the port "Data" of the packet processing section 30.

When the packet head position identification signal "start of packet" of "High" is input to the port "UP" of the packet counter 10, the packet counter 10 counts up the count value from "0" to "1". As a result, the clock control signal output from the port "enable" of the packet counter 10 changes from "Low" to "High". With that timing, the clock signal "Clock" from the clock controller 40 is output effectively. Thus, the clock signal "Clock" is input to the port "CLK" of the packet processing section 30.

Next, when the packet data "Data (packet 2)" is input, the packet counter 10 counts up its count value from "1" to "2". With the count value exceeding "1", the clock control signal output from the port "enable" remains "High".

The packet processing section 30 processes the packet data "Data (Packet 1)". Thus, the packet processing section 30 sends the packet head position identification signal "start of packet_0" at the port "SoP_0", the packet end position identification signal "end of packet_0" at the port "EoP_0", and the processed packet data "Data_0 (Packet 1-1)" at the port "Data_0".

In this operation, the packet counter 10 receives at its port "Down" the packet end position identification signal "end of packet_0" output from the port "EoP_0" of the packet processing section 30 and then counts down the count value from "2" to "1". However, since the count value is "1" or more, the clock control signal output from the port "enable" remains "High".

Next, the packet processing section 30 processes the packet data "Data (Packet 2)". The packet processing section 30 outputs the packet head position identification signal "start of packet_0" from the port "SoP_0", the packet end position identification signal "end of packet_0" from the port "EoP_0", and the processed packet data "Data_0 (Packet 2-1)" from the port "Data_0". In this operation, since the packet end position identification signal "end of packet_0" is output from the port "EoP_0" of the packet processing section 30 to the port "Down" of the packet counter 10, the packet counter 10 counts down the count value from "1" to "0".

When the count value of the packet counter 10 becomes "0", the port "enable" outputs the clock control signal of "Low". As a result, the clock controller 40 inhibits the outputting of the clock signal "Clock".

As described above, the clock signal, which is input to the packet processing section 30, is validated only when the packet process is being executed with packet data input therein. In other states, the clock signal is not input to the packet processing section 30 (or the clock signal is held in a "Low" state). Consequently, the power consumption of the packet processing section 30 can be suppressed when no packet to be processed exists.

When the packet processing circuit is configured with, for example, a CMOS LSI, the power consumption of the packet processing section 30 can be substantially zeroed with the clock signal sustained in a "Low" state.

Next, a packet processing circuit 100 according to a second embodiment of the present invention will be explained below by referring to FIG. 2.

In the second embodiment, a packet processing section 30A has two packet data output ports. The port "EoP_01" outputs the packet end position identification signal "end of packet_01" to the port "Down_1" of the packet counter 10A. The port "EoP_02" outputs the packet end position identification signal "end of packet_02" to the port "Down_2" of the packet counter 10A.

The data timing adjuster 20 is identical to that in the first embodiment shown in FIG. 1 and the clock controller 40 is identical to that in the first embodiment shown in FIG. 1. In the operation, every time the packet counter 10A receives the packet end position identification signal "end of packet_01" from the port "EoP_01" and the packet end position identification signal "end of packet_02" from the port "EoP_02", it counts down the count value by "1". The other operations are performed in accordance with the timing chart shown in FIG. 5.

Even in the second embodiment, the clock signal is validated only when the packet data to be processed exists so that the power consumption can be effectively reduced.

The above-mentioned configuration can deal with even the case where there are two packet output routes. Similarly, the above-mentioned configuration is applicable to three or more output routes, without being limited by the above-mentioned example.

A packet processing circuit 100 according to a third embodiment of the present invention will be explained by referring to FIG. 3.

The third embodiment has such a configuration that when the packet processing section 30B discards a packet, the port "delete" of the packet processing section 30B outputs a discard signal to the port "Down_2" of the packet counter 10B. Every time the discard signal is input to the port "Down_2", the packet counter 10B counts down the count value by "1". Other constituent elements are similar to those in the first embodiment shown in FIG. 1.

The clock signal control is not restricted to the case where the processed packet data is output. The above-mentioned configuration can control the clock signal even when the packet is erased in the packet processing section 30B.

Such a configuration allows the present invention to be applied to the packet processing circuit that has the function of erasing a packet therein.

The present has been explained according to the preferred embodiments. However, the present invention should not be restricted to only the above-mentioned embodiments and various modifications may be possible within the scope of the technical concept of the present invention.

Figure 4:
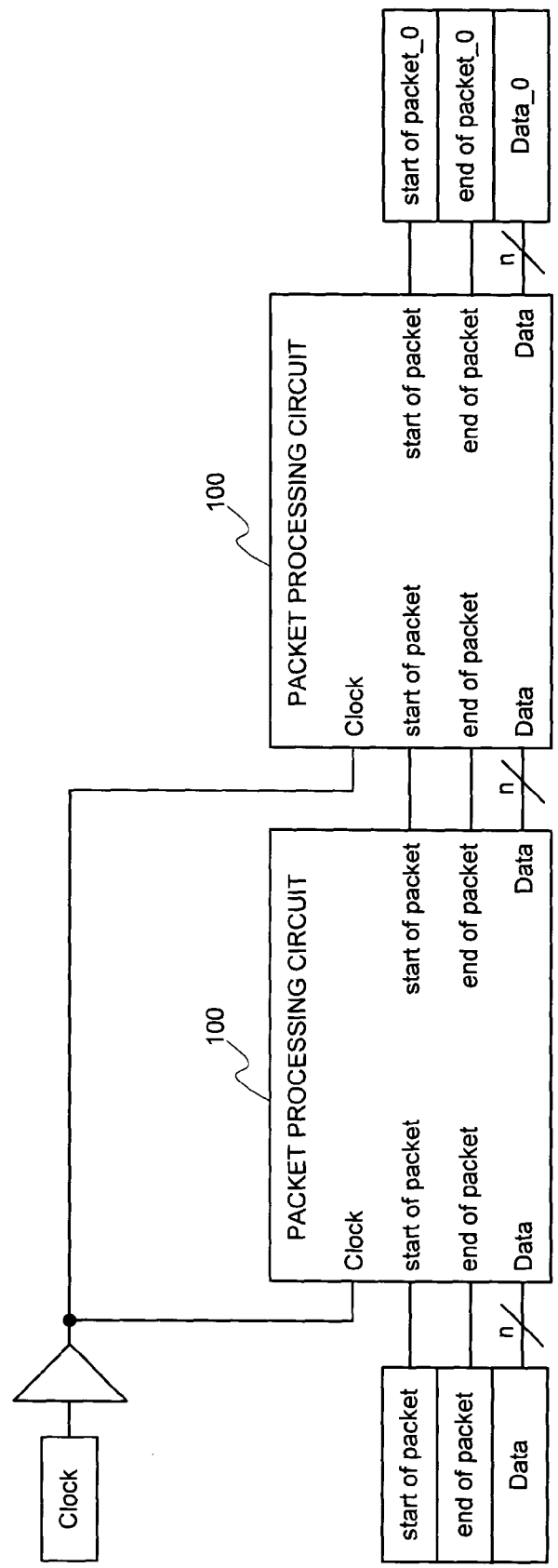
FIG. 4 is a block diagram illustrating an extended example of a packet processing circuit embodying the present invention.

For example, as shown in FIG. 4, a large packet processing circuit can be configured by serially connecting plural low-power consumption packet processing circuits 100 according to each of the first to third embodiments. In this configuration, the packet processing circuits 100 are respectively controlled with the clock signal. A division of conversion to low-power consumption in process units allows the power consumption to be reduced effectively.

Figure 2:
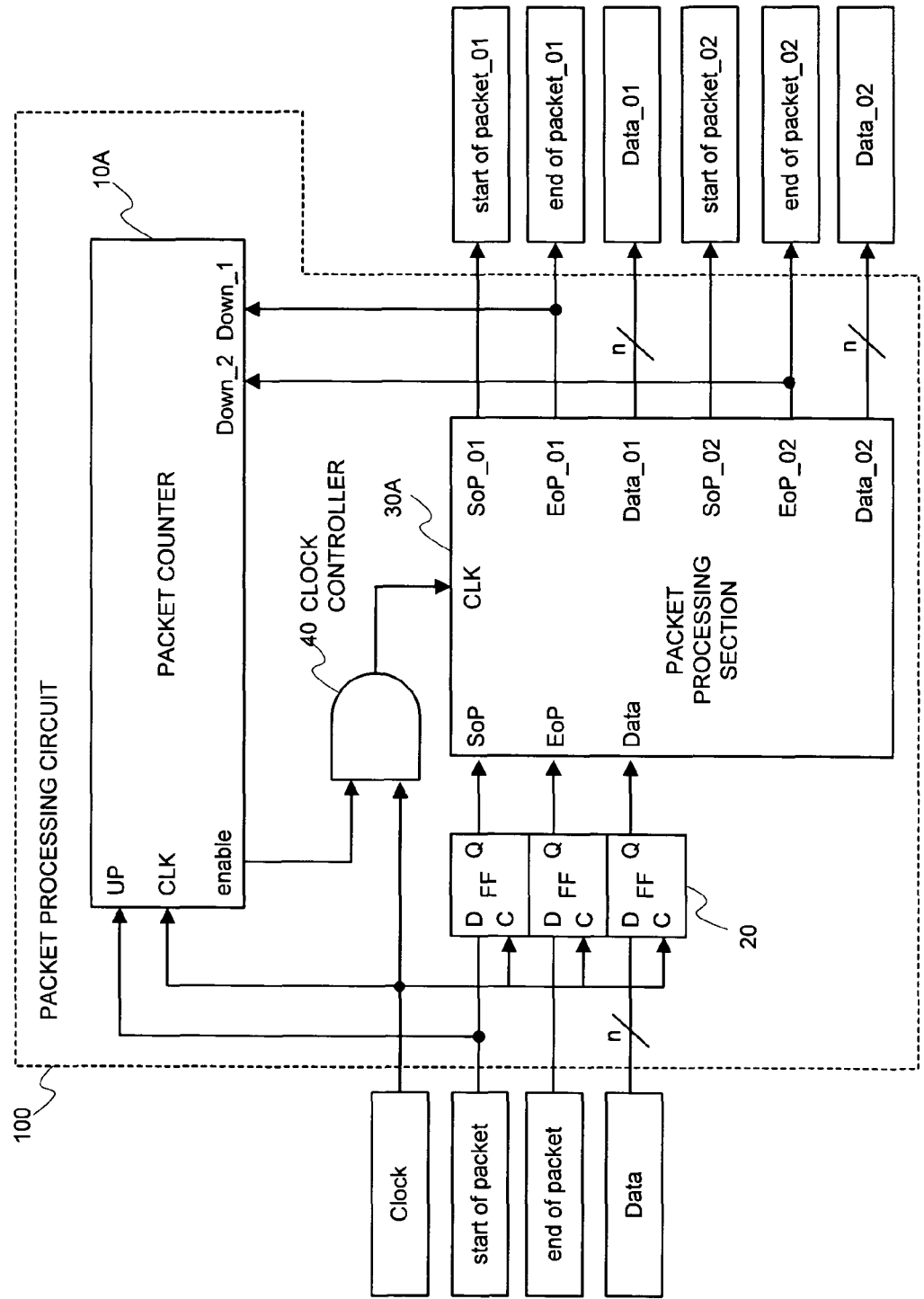
FIG. 2 is a block diagram illustrating the configuration of a packet processing circuit according to a second embodiment of the present invention.
Figure 3:
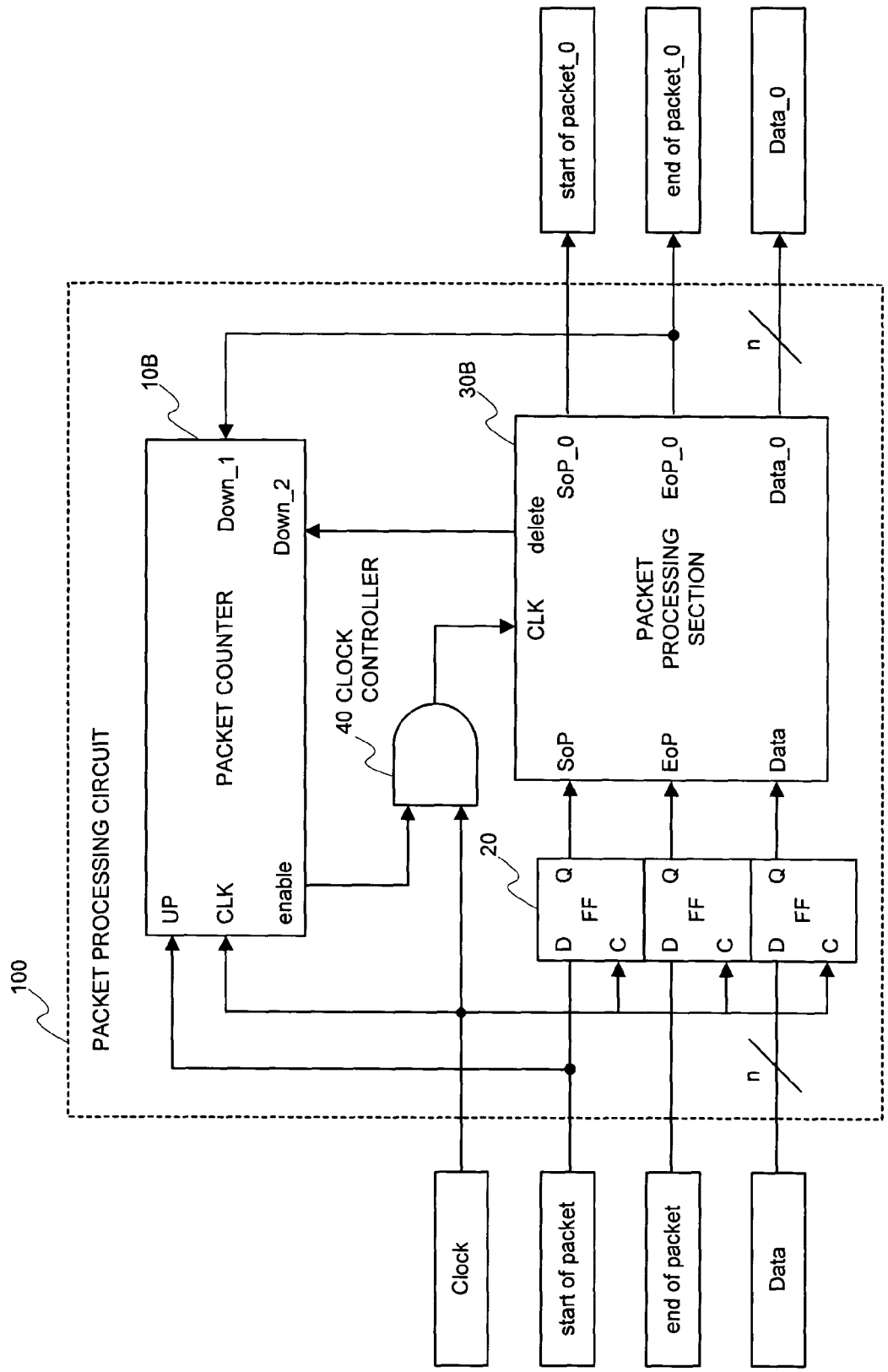
FIG. 3 is a block diagram illustrating the configuration of a packet processing circuit according to a third embodiment of the present invention.

Alternatively, the second embodiment shown in FIG. 2 and the third embodiment shown in FIG. 3 may be combined together. Thus, the present invention can be applied to the packet processing circuit that has plural output ports and that has the function of erasing the packets therein.

The above-mentioned embodiments have been shown as packet processing circuits adopting the present invention. However, the present invention should not be limited only to the packet processing circuits. Similarly, the present invention may be applicable to the circuit that processes communication data including the signal representing the beginning of data and the signal representing the end of the data, for example, to the communication data processing circuit that processes ATM cells.

As described above, the communication data processing circuit according to the present invention has the following advantages.

Firstly, the present invention can effectively reduce the power consumption. The reason is that the clock signal is input only when communication data to be processed exists but the clock signal is inhibited when communication data to be processed does not exist.

Secondly, the reduced power consumption leads to a reduced amount of heat generated in the circuit. This feature realizes omission or miniaturization of a heat dissipation part such as a heat sink mounted to transfer the heat generated in the circuit. Moreover, the entire of the circuit can be reduced in size.

The entire disclosure of Japanese Patent Application No. 2002-238156 filed on Aug. 19, 2002 including a specification, claims, drawings and summary are incorporated herein by reference in its entirely.

What is claimed is:

1. A communication data processing circuit comprising:
   a processing section for processing communication data;
   a data discrimination section for discriminating between the presence and absence of said communication data under process in said processing section; and
   a clock controller for inputting or halting a clock signal to said processing section in response to an output of said data discrimination section,
   wherein, said processing section processes said communication data based on said clock signal to be input, said processing circuit receiving said clock signal when communication data to be processed exists and halting said clock signal when no communication data to be processed exists,
   said data discrimination section comprises a counter counts up in response to said communication data input to said processing section and counts down in response to said communication data output from said processing section.

2. The communication data processing circuit defined in claim 1, wherein said communication data comprises packet data; and wherein said processing section comprises a packet processing section that processes said packet data.

3. The communication data processing circuit defined in claim 1, wherein said communication data comprises packet data; and wherein said processing section comprises a packet processing section that processes said packet data.

4. The communication data processing circuit defined in claim 1, comprising plural processing circuits interconnected, each of said plural processing circuits including said processing section, said data discrimination section, and said controller.

5. The communication data processing circuit defined in claim 4, wherein said communication data comprises packet data; and wherein said processing section comprises a packet processing section that processes said packet data.

6. A communication data processing circuit comprising:
   a communication data processing circuit comprising:
   a processing section for processing communication data;
   a data discrimination section for discriminating between the presence and absence of said communication data under process in said processing section; and
   a clock controller for inputting or halting a clock signal to said processing section in response to an output of said data discrimination section,
   wherein, said processing section which processes said communication data based on a said clock signal to be input, said processing circuit receiving said clock signal when communication data to be processed exists and halting said clock signal when no communication data to be processed exists, and said data discrimination section comprises a counter counts up in response to said communication data input to said processing section and counts down in response to said communication data output from said processing section; and wherein said clock controller halts said clock signal when the value of said counter is "0" and inputs said clock signal to said processing section when the value of said counter is a value except "0".

7. The communication data processing circuit defined in claim 6, wherein said counter counts up in response to a signal representing the beginning of said communication data input to said processing section and counts down in response to a signal representing an end of said communication data output from said processing section and turns off a control signal when a count value is "0" and turns on said control signal when a count value is a value except "0"; and wherein said clock controller halts said clock signal when the control signal of said counter is in an off state and inputs said clock signal to said processing section when the control signal of said counter is in an on state.

8. The communication data processing circuit defined in claim 7, further comprising a timing adjusting section for delaying a timing that said communication data is input to said processing section, by a predetermined clock corresponding to a time period during which both said data discrimination section and said clock controller process.

9. The communication data processing circuit defined in claim 7, wherein said processing section has a plurality of output ports for said communication data; and wherein said counter counts down a count value for each of plural sets of communication data output from said processing section.

10. The communication data processing circuit defined in claim 9, wherein said processing section has a function of discarding said communication data during process therein and outputs a discarding signal representing that said communication data has been discarded; and wherein said counter counts down a count value in response to said discarding signal input from said processing section.

11. The communication data processing circuit defined in claim 7, wherein said processing section has a function of discarding said communication data during process therein and outputs a discarding signal representing that said communication data has been discarded; and wherein said counter counts down a count value in response to said discarding signal input from said processing section.

12. The communication data processing circuit defined in claim 7, wherein said communication data comprises packet data; and wherein said processing section comprises a packet processing section that processes said packet data.

13. The communication data processing circuit defined in claim 6, wherein said processing section has a plurality of output ports for said communication data; and wherein said counter counts down a count value for each of plural sets of communication data output from said processing section.

14. The communication data processing circuit defined in claim 13, wherein said communication data comprises packet data; and wherein said processing section comprises a packet processing section that processes said packet data.

15. The communication data processing circuit defined in claim 6, wherein said processing section has a function of discarding said communication data during process therein and outputs a discarding signal representing that said communication data has been discarded; and wherein said counter counts down a count value in response to said discarding signal input from said processing section.

16. The communication data processing circuit defined in claim 15, wherein said communication data comprises packet data; and wherein said processing section comprises a packet processing section that processes said packet data.

17. The communication data processing circuit defined in claim 6, wherein said communication data comprises packet data; and wherein said processing section comprises a packet processing section that processes said packet data.

* * * * *